(12) United States Patent
Rubio et al.

(10) Patent No.: US 10,039,405 B2
(45) Date of Patent: Aug. 7, 2018

(54) METHOD FOR OBTAINING A COOKING VESSEL HAVING A COLORED HARD ANODIZED OUTER FACE

(71) Applicant: SEB S.A., Ecully (FR)

(72) Inventors: Martin Rubio, Rumilly (FR); Stephane Tuffe, Cognin (FR)

(73) Assignee: SEB S.A., Ecully (FR)

( * ) Notice: Subject to any disclaimer, the term of this patent is extended or adjusted under 35 U.S.C. 154(b) by 750 days.

(21) Appl. No.: 14/356,296

(22) PCT Filed: Nov. 5, 2012

(86) PCT No.: PCT/FR2012/052549
§ 371 (c)(1),
(2) Date: May 5, 2014

(87) PCT Pub. No.: WO2013/068681
PCT Pub. Date: May 16, 2013

(65) Prior Publication Data
US 2015/0053665 A1   Feb. 26, 2015

(30) Foreign Application Priority Data
Nov. 7, 2011   (FR) .................................... 11 60130

(51) Int. Cl.
*F27D 11/00* (2006.01)
*A47J 27/00* (2006.01)
(Continued)

(52) U.S. Cl.
CPC ............ *A47J 27/002* (2013.01); *A47J 27/004* (2013.01); *A47J 36/02* (2013.01); *C23C 28/00* (2013.01);
(Continued)

(58) Field of Classification Search
CPC ........ A47J 27/002; A47J 27/004; A47J 36/02; C23C 28/00; C25D 11/022; C25D 11/16; C25D 11/24; C25D 11/243; C25D 11/08
(Continued)

(56) References Cited

U.S. PATENT DOCUMENTS 3,844,908 A    10/1974 Matsuo et al.
8,071,219 B2*  12/2011 Berrux .................. A47J 27/002
                                                        428/425.5
(Continued)

FOREIGN PATENT DOCUMENTS

CA    2246215       3/1999
CN    101396229 A   4/2009
(Continued)

*Primary Examiner* — Arthur O Hall
*Assistant Examiner* — Adam J Rogers
(74) *Attorney, Agent, or Firm* — The Webb Law Firm

(57) ABSTRACT

Provided is a method for obtaining a cooking vessel having the following steps: producing a bowl having an outer face made of aluminum and an inner face, carrying out hard anodization of at least the outer face of the bowl. According to the method, at least one coloring step is carried out on the anodized outer face after hard anodization, said coloring step employing at least one water-soluble inorganic pigment. Also provided is a culinary article or an electric cooking appliance comprising a cooking vessel obtained by the above method.

21 Claims, 1 Drawing Sheet

(51) Int. Cl.
*A47J 36/02* (2006.01)
*C25D 11/24* (2006.01)
*C25D 11/16* (2006.01)
*C25D 11/02* (2006.01)
*C23C 28/00* (2006.01)
*C25D 11/08* (2006.01)

(52) U.S. Cl.
CPC ............ *C25D 11/022* (2013.01); *C25D 11/16* (2013.01); *C25D 11/24* (2013.01); *C25D 11/243* (2013.01); *C25D 11/08* (2013.01)

(58) Field of Classification Search
USPC ........................................................ 219/438
See application file for complete search history.

(56) References Cited

U.S. PATENT DOCUMENTS

| | | | | |
|---|---|---|---|---|
| 9,788,677 B2* | 10/2017 | Le Bris | ................ | A47J 27/002 |
| 2009/0159601 A1* | 6/2009 | Berrux | ................... | A47J 36/02 |
| | | | | 220/573.1 |
| 2009/0169838 A1* | 7/2009 | Yamaguchi | .............. | B05D 5/06 |
| | | | | 428/201 |
| 2010/0143622 A1 | 6/2010 | Schreuder | | |
| 2010/0175681 A1* | 7/2010 | Rael | ........................ | A47J 36/02 |
| | | | | 126/211 |
| 2011/0308989 A1* | 12/2011 | Berrux | .................. | A47J 27/002 |
| | | | | 206/524.3 |
| 2013/0313247 A1* | 11/2013 | Rubio | .................... | A47J 36/02 |
| | | | | 219/621 |
| 2014/0326734 A1* | 11/2014 | Le Bris | ................ | A47J 27/002 |
| | | | | 220/573.3 |

FOREIGN PATENT DOCUMENTS

| | | | | |
|---|---|---|---|---|
| CN | 101563484 A | 10/2009 | | |
| EP | 0424072 A1 | 4/1991 | | |
| EP | 0902105 A1 | 3/1999 | | |
| EP | 1894502 A1 | 3/2008 | | |
| EP | 2206801 A1 | 7/2010 | | |
| FR | 1059522 | 3/1954 | | |
| FR | 2967563 A1 * | 5/2012 | ............. | A47J 36/02 |
| GB | 884477 | 12/1961 | | |
| GB | 1099486 | 1/1968 | | |
| JP | 59-118121 | 7/1984 | | |

* cited by examiner

METHOD FOR OBTAINING A COOKING VESSEL HAVING A COLORED HARD ANODIZED OUTER FACE

CROSS-REFERENCE TO RELATED APPLICATIONS

This application is the United States national phase of International Application No. PCT/FR2012/052549 filed Nov. 5, 2012, and claims priority to French Patent Application No. 1160130 filed Nov. 7, 2011, the disclosures of which are hereby incorporated in their entirety by reference.

FIELD OF THE INVENTION

The present invention relates to the technical field of cooking appliances and utensils having a cooking vessel.

The present invention more particularly, but not exclusively, relates to culinary articles such as casseroles, skillets, or woks, and also to electric cooking appliances comprising a bowl designed to contain foods.

DESCRIPTION OF RELATED ART

Document GB 1 099 486 discloses the production of aluminum cooking vessels having a hard anodized surface layer. If desired, this surface layer can be pigmented. The surface thus obtained is easier to clean than a non-anodized surface. However, the surface thus obtained is not as easy to clean as a surface coated with a non-stick layer.

Document EP 0 424 072 and document EP 0 902 105 propose producing cooking vessels having a non-stick coating such as PTFE on a hard anodized aluminum substrate. Hard anodization is thus carried out prior to the PTFE coating. This arrangement makes it possible to improve the resistance of the PTFE coating to wear and to scratches. Typically, the PTFE coating is mainly used to coat the inner face of cooking appliances because of the limited mechanical resistance of this type of coating.

Document EP 1 894 502 discloses the provision of a sol-gel coating on at least one face of a culinary article having an aluminum or aluminum alloy substrate, wherein this substrate can be made of anodized aluminum. This document envisions an anodization layer thickness of between 5 and 100 μm. If desired, the other face can be coated with PTFE. The sol-gel coating makes it possible to improve the dishwasher durability of the cooking vessel as well as flame resistance of the cooking vessel.

Application FR 10 59522 discloses the production of a cooking vessel having a hard anodized and colored outer face, wherein a sol-gel coating is provided on said hard anodized outer face. Such a production makes it possible to obtain cooking vessels for which the colorings of the outer face have a durable nature, are able to withstand the detergents used in dishwashers, and are flame resistant. A disadvantage of the proposed production resides in the complexity of the method employed, which requires numerous steps.

An object of the present invention is to propose colorings of the anodized outer surface of a cooking vessel that have a durable nature, without requiring any protective coating.

Another object of the present invention is to propose colorings of the anodized outer surface of a cooking vessel that are able to withstand the flames used for cooking, without requiring any protective coating.

Another object of the present invention is to propose colorings of the anodized outer surface of a cooking vessel that are able to withstand the detergents used in dishwashers, without requiring any protective coating.

An additional object of the present invention is to propose colorings of the anodized outer surface of a cooking vessel that are compatible with a PTFE coating of the inner surface of said cooking vessel, without requiring any protective coating.

SUMMARY OF THE INVENTION

These objects are achieved with a method for obtaining a cooking vessel comprising the following steps:
producing a bowl having an aluminum outer face and an inner face,
carrying out hard anodization of at least the outer face of the bowl, wherein at least one coloring step is carried out on the anodized outer face after hard anodization, said coloring step employing at least one water-soluble inorganic pigment. Surprisingly, tests have shown that colorings of anodized outer surfaces of cooking vessels carried out in this manner have a durable nature, even when the cooking vessel is exposed to flame, without requiring any type of protective coating such as a sol-gel, glaze, lacquer, or PTFE coating.

The coloring step advantageously employs dipping in an aqueous solution of salt- and or metal oxide-based water-soluble compounds. Cobalt acetate or potassium permanganate, for example, have suitable properties.

According to an advantageous embodiment, the inorganic pigment or at least one of the inorganic pigments is a ferric oxalate. Surprisingly, it was observed that inorganic pigments of the aforementioned type make it possible to obtain colorings of the anodized outer surface of a cooking vessel that have a durable nature, even when the cooking vessel is exposed to flame, and also a satisfactory resistance to the detergents used in dishwashers, without requiring any type of additional protective coating such as sol-gel, glaze, lacquer, or PTFE coatings.

According to a preferred embodiment, the inorganic pigment or at least one of the inorganic pigments is an ammonium ferric oxalate. Alternatively, the inorganic pigment or at least one of the inorganic pigments could in particular be a sodium ferric oxalate.

According to a preferred embodiment, said method comprises a step of providing a PTFE coating on the inner face of the bowl. If desired, the step of providing a PTFE coating can include a preparation of the surface as well as the deposition of one or several intermediate layers. The PTFE coating can in particular be produced by lamination.

According to an embodiment then, the method comprises a step of providing a PTFE coating on the inner face of the bowl, and the step of carrying out hard anodization of the outer face of the bowl comes after the step of providing a PTFE coating on the inner face of the bowl. The anodization carried out after the PTFE coating has the advantage of only anodizing the outer face of the bowl, which makes it possible to cut back on the treatment time and to reduce the consumption of power and acid compared to anodization of both the outer face and the inner face of the bowl. Furthermore, PTFE effectively withstands the sulfuric acid bath typically used for anodization.

If desired, the method comprises a step of carrying out preliminary hard anodization of the outer face and of the inner face of the bowl prior to the step of providing a PTFE coating on the inner face of the bowl, the step of carrying out hard anodization of the outer face of the bowl coming after a step of stripping the outer face of the bowl subsequent to the step of providing a PTFE coating on the inner face of the bowl. This preliminary hard anodization treatment involves the inner face and the outer face of the bowl and makes it possible to obtain a hard base prior to providing the PTFE coating.

According to another embodiment, the hard anodization step and the coloring step are carried out on the inner face and the outer face of the bowl. This hard anodization treatment involves the inner face and the outer face of the bowl and makes it possible to obtain a hard base.

The method advantageously comprises a step of providing a PTFE coating on the inner face of the bowl after the coloring step. The step of providing a PTFE coating can be envisioned after the coloring step because the pigments envisioned are resistant to the temperatures used during the baking of the PTFE coating.

According to an advantageous feature of the invention, the hard anodization is carried out at a temperature greater than or equal to 0° C. At lower anodization temperatures, the pores formed during anodization are in fact very dense and very small and the coloring of the hard anodized surface is not achieved.

According to another advantageous feature of the invention, hard anodization is carried out at a temperature less than or equal to 17° C. At higher anodization temperatures, the pores formed during anodization are too large and the anodization is not sufficiently hard, even though the coloring is effectively achieved.

According to a preferred feature of the invention, hard anodization is carried out at a temperature of between 5° C. and 12° C. For this temperature range, the pores formed during the anodization are sufficiently small so that the anodized surface is sufficiently hard, and sufficiently large so that the water-soluble inorganic pigments effectively color the hard anodized surface.

These objects are also achieved with a cooking vessel obtained by a method compliant with at least one of the aforementioned features.

According to an advantageous embodiment, the bowl is obtained by stamping a substrate having at least one aluminum face, said face then forming the outer face of the bowl.

According to an embodiment then, the substrate has two aluminum faces. Specifically, the substrate can be made of solid aluminum or of a colaminate having two aluminum faces and a steel core. If desired, the steel can be chosen from the stainless steels.

According to another embodiment then, the substrate is formed by a colaminate having an aluminum face and a stainless steel face, this stainless steel face being advantageously designed to be coated with PTFE.

According to another advantageous embodiment, the bowl is made of die-cast aluminum.

According to an advantageous embodiment, the outer face of the bowl has a brushed or micro-blasted surface. The anodization treatment is a surface treatment in which the material of the surface is modified and not a surface coating in which one or several layers are added to an existing surface. The hard anodization treatment is not limited to smooth or polished surface states; in particular anodization is conceivable on a brushed or micro-blasted surface.

For obtaining an induction-compatible cooking vessel, the bowl advantageously comprises at least one insert made of ferromagnetic material.

These objects are also achieved with a culinary article comprising a cooking vessel and a handle attached to said cooking vessel by at least one rivet or by welding, said cooking vessel complying with at least one of the aforementioned features.

These objects are also achieved with an electric cooking appliance comprising a cooking vessel associated with heating means, said cooking vessel complying with at least one of the aforementioned features.

BRIEF DESCRIPTION OF THE DRAWINGS

The invention will be more clearly understood by studying exemplary embodiments that are in no way limiting and illustrated in the appended figures, wherein.

DETAILED DESCRIPTION OF THE INVENTION

Figure 1:
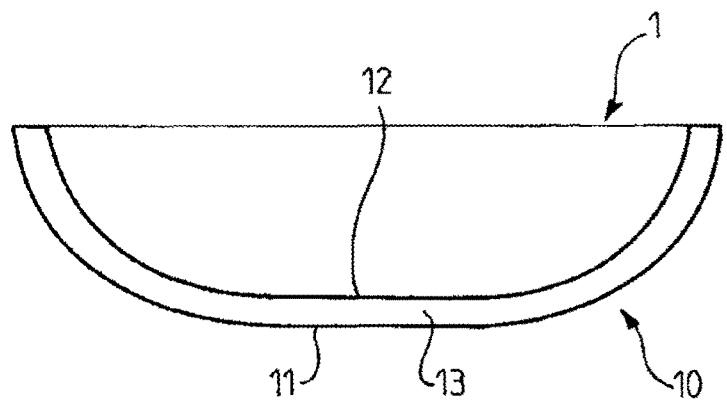
FIG. 1 illustrates a cooking vessel 1 of the invention.
Figure 2:
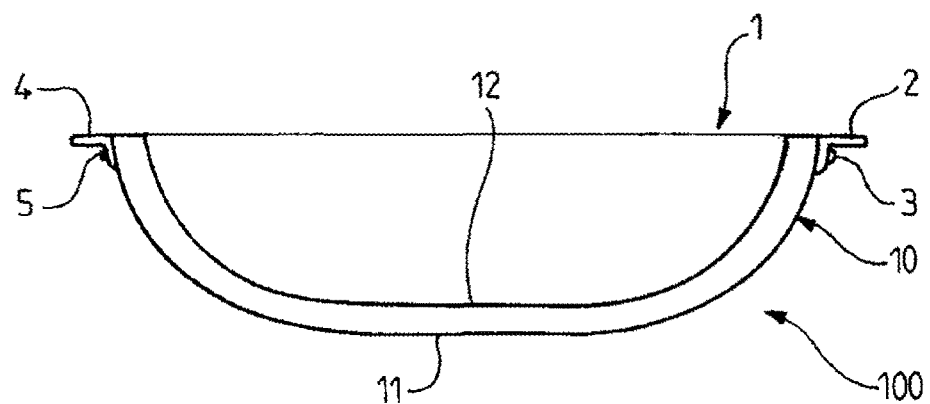
FIG. 2 illustrates a culinary article 100 comprising a cooking vessel 1 of the invention.

The cooking vessel 1 illustrated in FIGS. 1 and 2 comprises a bowl 10 having an aluminum outer face 11 as well as an inner face 12.

According to an embodiment, the bowl 10 is obtained by stamping a substrate 13 having at least one aluminum surface designed to form the outer face 11 of the bowl 10.

According to an embodiment, the substrate 13 has two aluminum faces designed to form, respectively, the outer face 11 and the inner face 12 of the bowl 10.

If desired, the substrate 13 can be made of solid aluminum. Specifically, an alloy of aluminum 3003 can be used to this end. The substrate 13 used to produce the bowl 10 is then cut from an aluminum sheet.

According to another embodiment, the substrate 13 is formed by a colaminate having an aluminum face and a stainless steel face, the aluminum face being designed to form the outer face 11 of the bowl, the stainless steel face being designed to form the inner face 12 of the bowl 10.

According to another embodiment, the bowl 10 is made of die-cast aluminum, for example with an AlSi12 aluminum alloy.

If desired, the outer face 11 of the bowl 10 is not necessarily smooth or polished, but specifically can have a brushed or micro-blasted surface.

If desired, the bowl 10 can comprise at least one insert made of ferromagnetic material, such as a ferritic steel, for producing a cooking vessel 1 that can be heated by induction. Preference is given to the ferromagnetic material being a ferritic stainless steel. If desired, the insert made of ferromagnetic material can be formed by a plate having one or more perforations. The insert is advantageously assembled by hot or cold stamping with the aluminum of the substrate 13 or is coated with cast aluminum, with preference given to the perforation or perforations being filled with the aluminum. The insert made of ferromagnetic material can have at least one visible part, which must be protected by masking in the acid chemical baths, specifically the anodization bath or baths.

The cooking vessel 1 of the invention is obtained by a method comprising the following steps:
  producing a bowl 10 having an aluminum outer face 11 and an inner face 12,
  carrying out hard anodization of at least the outer face 11 of the bowl 10, wherein at least one coloring step is carried out on the anodized outer face after the hard anodization, said coloring step employing at least one water-soluble inorganic pigment.

Inorganic pigments effectively withstand temperatures that can exceed 300° C., even 400° C. Water-soluble inorganic pigments make it possible to obtain colorings of the anodized outer surface of a cooking vessel that have a durable nature. The coloring step or one of the coloring steps employs a coloring bath containing water-soluble metal compounds, which will precipitate and become trapped inside the pores of the hard anodized layer. It is apparently no longer necessary to add a protective coating for preserving the coloring of the anodized outer surface of the cooking vessel resting on a hot plate or even exposed to a flame from a burner such as a gas burner.

According to an advantageous embodiment, the coloring step employs dipping in an aqueous solution of salt- and/or metallic oxide-based water-soluble compounds.

Of the water-soluble inorganic pigments, cobalt acetate ($Co(CH_3COO)_2$, $H_2O$) or potassium permanganate ($KMnO_4$) make it possible to obtain bronze colorings, whereas ammonium ferric oxalate [$(NH_4)Fe(C_2O_4)3H_2O$] makes it possible to obtain yellow to ochre colorings.

Tests conducted with the ammonium ferric oxalate "jaune Gold4N" from OMYA have surprisingly shown that the coloring obtained effectively withstands detergents used in dishwashers without any type of additional protective coating, specifically sol-gel, glaze, lacquer, or PTFE coatings. Hence according to a preferred embodiment, the inorganic pigment or at least one of the inorganic pigments is a ferric oxalate. The use of ferric oxalates other than ammonium ferric oxalate, for example sodium ferric oxalate or potassium ferric oxalate, is conceivable.

Prior to coloring, the surfaces to be colored are subjected to scouring in an alkaline product followed by rinses and neutralization in acid medium. If desired, a preliminary mechanical preparation such as a mechanical preparation by polishing, brushing, sandblasting or grit blasting can be carried out, depending upon the surface sought. After the neutralization, a brightening can be carried out by dipping in a phosphoric acid bath. The step of anodization in a sulfuric acid solution is carried out with an acid concentration between 10 and 500 g/l, at a temperature between −10° C. and +30° C., and with a continuous current having a current density between 0.1 and 5 A/dm². Tests have shown that in order to obtain a sufficiently hard anodization, the temperature of the anodization bath must be less than or equal to 17° C., and preferably less than or equal to 12° C.; in order to obtain a coloring of the hard anodized surface, the temperature of the anodization bath must be greater than or equal to 0° C., and preferably greater than or equal to 5° C. The anodization operation is followed by several rinses, the last of which is carried out using distilled water. This treatment series results in the formation of an anodized layer having a thickness that varies according to the treatment time from 5 to 100 μm and a hardness ranging from 100 to 600 Vickers.

The coloring bath is advantageously made up of an aqueous solution comprising between 5 and 100 g/l of ammonium ferric oxalate [$(NH_4)Fe(C_2O_4)3H_2O$]. The aqueous solution is prepared with distilled water. The pH obtained is between 4 and 6. The temperature of the coloring bath is between 10 and 60° C. The coloring time depends upon the color sought and is typically between 1 and 30 min. Depending upon the concentration of the coloring bath and the coloring time, colors ranging from dark brown to golden yellow can be obtained.

Preference is given to the coloring step being followed by a rinse step. The rinse step can be followed by a sealing step. The sealing step can employ, for example, boiling water, or saturated steam, or a bath containing metallic salts of nickel and/or lithium. In any case, having a sealing step does not appear to modify the durability of the obtained colorings significantly.

The method advantageously comprises a step of providing a PTFE coating on the inner face of the bowl. The step of providing a PTFE coating can in particular be carried out by lamination. If desired, use can be made of a filled PTFE for improving the resistance of the surface of the PTFE-coated inner face 12 of the bowl 10. In particular use can be made of mineral particles as a reinforcement filler. For obtaining the PTFE cooking surface, the PTFE coating is heated to a temperature above 400° C. (typically around 420° C.).

According to an embodiment, the step of carrying out hard anodization of the outer face 11 of the bowl 10 comes before the step of providing the PTFE coating on the inner face 12 of the bowl 10. The obtaining of a PTFE coating after hard anodization is disclosed specifically in document EP 0 902 105. This arrangement makes it possible to obtain a hard base, thus improving the mechanical resistance of the PTFE coating.

According to another embodiment, the step of carrying out hard anodization of the outer face 11 of the bowl 10 comes after the step of providing the PTFE coating on the inner face 12 of the bowl 10.

If desired, a step of carrying out a preliminary hard anodization of the outer face 11 and of the inner face 12 of the bowl 10 is conceivable prior to the step of providing a PTFE coating on the inner face 12 of the bowl 10. This prior hard anodization treatment makes it possible to obtain a hard base under the PTFE coating. However, a stripping of the outer face 11 of the bowl 10 is then necessary in order to re-anodize said outer face 11 before proceeding with a coloring step. The step of carrying out hard anodization of the outer face 11 of the bowl 10 then comes after a step of stripping the outer face 11 of the bowl 10 subsequent to the step of providing a PTFE coating on the inner face 12 of the bowl 10.

The hard anodization step can be carried out on the inner face 12 and the outer face 11 of the bowl 10 in order to obtain a hard base. The hard anodization step is then a step in which both faces are hard anodized.

If desired, the coloring step can be carried out on the inner face 12 and the outer face 11 of the bowl after the hard anodization step. A step of providing a PTFE coating on the inner face 12 of the bowl 10 is then conceivable after the coloring step.

Alternatively, a step of providing a PTFE coating on the inner face 12 of the bowl 10 is conceivable after the step in which both faces are hard anodized. Another hard anodization step is then carried out on the outer face 11 of the bowl 10 after the step of providing a PTFE coating on the inner face 12 of the bowl 10. The coloring step on the hard-anodized outer face 11 of the bowl 10 is carried out after the other hard anodization step.

If desired, a surface preparation prior to the hard anodization can comprise an acid or alkaline degreasing and/or an acid or alkaline stripping, and/or nitric acid ($HNO_3$) neutralization. A degreasing of a few minutes in a bath of NaOH at a concentration of 50 g/l at a temperature of around 50° C. gives satisfactory results.

The hard anodization treatment can specifically be carried out by soaking in a bath. The preliminary hard anodization treatment can also be carried out by soaking in a bath. The hard anodization has the advantage of effectively resisting scratches and blows. Compared to enameling, a broader range of materials is thus conceivable for producing the bowl 10 without sacrificing the cleaning properties conferred by the PTFE coating of the inner face 12 of said bowl 10.

The hard anodization can be obtained, for example, with a bath of $H_2SO_4$ at a concentration of 130 g/l for 90 min at a temperature of around 10° C. with a current density of around 1.8 $A/dm^2$. Lower temperatures of around 0° C. with a higher current density make it possible to reduce the treatment time.

A hard anodized layer having a thickness of between 10 µm and 30 µm has a hardness of around 350 Hv and gives satisfactory results in terms of both mechanical resistance and coloring possibilities.

According to a preferred feature, the anodized outer face 11 has pores smaller than 30 nm and preferably smaller than 20 nm.

The method of the invention can comprise the following exemplary embodiments in particular:

Example 1

PTFE lamination of the inner face 12, hard anodization of the outer face 11, coloring of the hard anodized outer face 11.

Example 2 preliminary hard anodization of both faces of the bowl 10 to obtain a hard base, PTFE lamination of the inner face 12, hard anodization of the outer face 11, coloring of the hard anodized outer face 11.

Example 3 hard anodization of both faces of the bowl 10 to obtain a hard base, coloring of the hard anodized outer face 11 and of the hard anodized inner face 12, PTFE lamination of the inner face 12.

Example 4 hard anodization of both faces of the bowl 10 to obtain a hard base, coloring of the hard anodized outer face 11 and of the hard anodized inner face 12, PTFE lamination of the inner face 12, hard anodization of the outer face 11, coloring of the hard anodized outer face 11.

Example 5 hard anodization of both faces of the bowl 10 to obtain a hard base, coloring of the hard anodized outer face 11 and of the hard anodized inner face 12.

FIG. 2 illustrates a culinary article 100 comprising a cooking vessel 1 and a handle 2 attached to said cooking vessel 1 by at least one rivet 3. To this end, the rivet 3 is inserted in a hole bored in the bowl 10 of the cooking vessel 1. If desired, use can be made of several rivets 3 to attach the handle 2 to the cooking vessel 1. Preference is given to using between two and four rivets 3 to attach the handle 2 to the cooking vessel 1. Alternatively, the handle 2 could be attached to said cooking vessel 1 by welding. If desired, another handle 4 can be attached to said cooking vessel 1 by at least one other rivet 5 or by welding.

Figure 3:
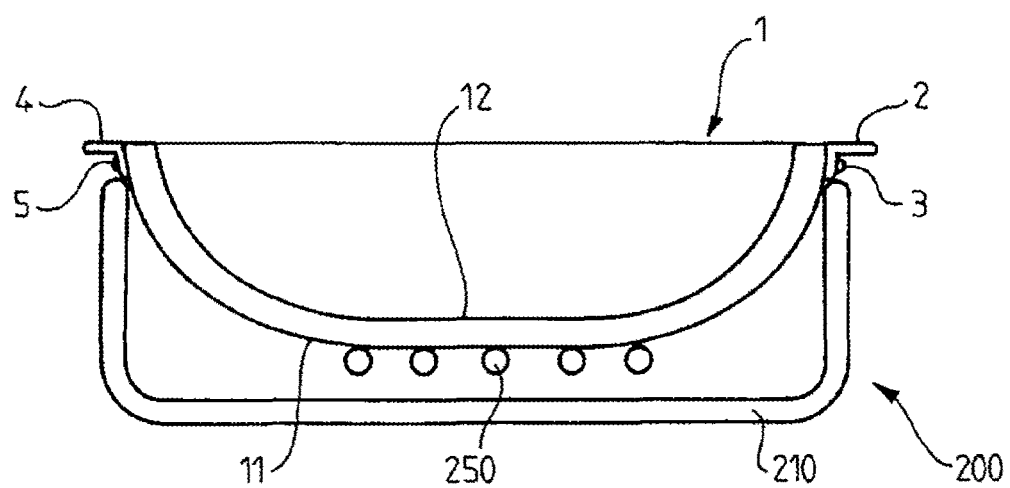
FIG. 3 illustrates schematically an electric cooking appliance 200 comprising a cooking vessel 1 of the invention.

FIG. 3 illustrates an electric cooking appliance 200 comprising a cooking vessel 1 associated with heating means 250. The cooking vessel 1 forms a bowl arranged in a heating base 210 comprising the heating means 250. The outer face 11 of the bowl 10 rests on the heating means 250. If desired, the outer face 11 can be integrally formed with the heating means 250.

Alternatively, the inner face 12 of the bowl 10 does not have to be coated with PTFE; other kinds of coatings are conceivable if desired.

Alternatively, the inner face 12 of the bowl 10 does not have to be coated. Specifically, the inner face 12 of the bowl 10 can be polished if desired.

The present invention is in no way limited to the exemplary embodiments described herein, but encompasses numerous modifications in the scope of the claims.

The invention claimed is:

1. Method for obtaining a cooking vessel, comprising the following steps:
   producing a bowl having an aluminum outer face and an inner face,
   providing a PTFE coating on the inner face of the bowl, and
   carrying out hard anodization of at least the outer face of the bowl, wherein the step of carrying out hard anodization of the outer face of the bowl comes after the step of providing a PTFE coating on the inner face of the bowl, and wherein at least one coloring step is carried out on the anodized outer face after the hard anodization, wherein said coloring step employs at least one water-soluble inorganic pigment, wherein said coloring step employs a coloring bath containing water-soluble metal compounds that precipitate and become trapped inside the pores of the hard anodized layer, thereby coloring the anodized outer surface, wherein a water-soluble inorganic pigment of the at least one water-soluble inorganic pigment is a ferric oxalate.

2. Method for obtaining a cooking vessel as in claim 1, wherein the coloring step employs dipping in an aqueous solution of salt-based and/or metal oxide-based water-soluble compounds.

3. Method for obtaining a cooking vessel as in claim 1, wherein a water-soluble inorganic pigment of the at least one water-soluble inorganic pigment is an ammonium ferric oxalate.

4. Method for obtaining a cooking vessel as in claim 1, including a step of carrying out preliminary hard anodization of the outer face and of the inner face of the bowl prior to the step of providing a PTFE coating on the inner face of the bowl and that the step of carrying out hard anodization of the outer face of the bowl comes after a step of stripping the outer face of the bowl subsequent to the step of providing a PTFE coating on the inner face of the bowl.

5. Method for obtaining a cooking vessel as in claim 1, wherein the hard anodization is carried out at a temperature greater than or equal to 0° C.

6. Method for obtaining a cooking vessel as in claim 5, wherein the hard anodization is carried out at a temperature less than or equal to 17° C.

7. Method for obtaining a cooking vessel as in claim 1, wherein the hard anodization is carried out at a temperature between 5° C. and 12° C.

8. Cooking vessel that is obtained by the method of claim 1.

9. Cooking vessel as in claim 8, wherein the bowl is obtained by stamping a substrate having at least one aluminum face.

10. Cooking vessel as in claim 9, wherein the substrate has two aluminum faces.

11. Cooking vessel as in claim 9, wherein the substrate is made of solid aluminum.

12. Cooking vessel as in claim 9, wherein the substrate is formed by a co-laminate having an aluminum face and a stainless steel face.

13. Cooking vessel as in claim 8, wherein the bowl is made of die-cast aluminum.

14. Cooking vessel as in claim 8, wherein the outer face of the bowl has one of a brushed or micro-blasted surface.

15. Cooking vessel as in claim 8, wherein the bowl comprises at least one insert made of ferromagnetic material.

16. Culinary article comprising a cooking vessel and a handle attached to said cooking vessel by at least one rivet or by welding, wherein said cooking vessel is compliant with claim 8.

17. Electric cooking appliance comprising a cooking vessel associated with heating means, wherein said cooking vessel is compliant with claim 8.

18. Method for obtaining a cooking vessel, comprising the following steps:
   producing a bowl having an aluminum outer face and an inner face,
   carrying out hard anodization on the inner face and the outer face of the bowl, wherein at least one coloring step is carried out on the anodized outer face after the hard anodization, and
   providing a PTFE coating on the inner face of the bowl after the coloring step, wherein said coloring step employs at least one water-soluble inorganic pigment, wherein said coloring step employs a coloring bath containing water-soluble metal compounds that precipitate and become trapped inside the pores of the hard anodized layer, thereby coloring the anodized outer surface, wherein a water-soluble inorganic pigment of the at least one water-soluble inorganic pigment is a ferric oxalate, and wherein the coloring step is carried out on the inner face and the outer face of the bowl.

19. Method for obtaining a cooking vessel as in claim 18, wherein the coloring step employs dipping in an aqueous solution of salt-based and/or metal oxide-based water-soluble compounds.

20. Method for obtaining a cooking vessel as in claim 18, wherein a water-soluble inorganic pigment of the at least one water-soluble inorganic pigment is an ammonium ferric oxalate.

21. Cooking vessel that is obtained by the method of claim 18.

* * * * *